Oct. 1, 1963    J. A. LORETT ETAL    3,105,520
DUCTS

Filed April 8, 1960    2 Sheets-Sheet 1

Jezy Andre Lorett, &
Michael Thomas Alphonsus McGrath
Inventors

By
Fred L. Witherspoon, Jr. &
Fred. E. Shoemaker Attorneys

United States Patent Office 3,105,520
Patented Oct. 1, 1963

3,105,520
DUCTS
Jezy André Lorett, Leicester, and Michael Thomas Alphonsus McGowan, Ponteland, England, assignors to Richardsons, Westgarth & Co. Limited, Wallsend, England
Filed Apr. 8, 1960, Ser. No. 20,919
Claims priority, application Great Britain Apr. 13, 1959
2 Claims. (Cl. 138—39)

This invention relates to ducts for conveying fluid gases or liquids under pressure or vacuum.

Where such a duct includes a corner, steps must be taken to ensure that the flow of energy with which the fluid enters the inlet side of the corner is substantially maintained at the outlet side of the corner. This is generally achieved by arranging cascade or other flow-guiding means in the corner. However, while the incorporation of the flow-guiding means substantially reduces the energy loss, the pressure level generally prevailing in such a duct makes it essential for the corner casing to be of considerable strength if it is to withstand the pressure exerted on it by the fluid.

As the corner casings are usually of welded construction, the reliability of the welded seam is of considerable importance. If the corner casings include cascade guide means (generally referred to as "cascade bends"), they usually consist of two cylindrical ducts cut off at a predetermined angle and joined to opposite ends of an elliptical cascade belt which is fitted with so-called cascade blades or vanes. If the strength of the cascade blades themselves is taken into consideration, the stress to which the elliptical cascade belt is subjected may easily be kept within acceptable limits. Since, however, the quality of the welded joints between the cascade blades and the cascade belt cannot be ascertained by X-ray examination, it is frequently necessary to disregard their contribution to the strength of the construction. As a result, the elliptically-shaped cascade belt must be reinforced to withstand bending loads, which calls for very thick walls and/or heavy external ribbing. Furthermore, the geometry of the welded joints between the cascade belt and the ducts is such that considerable expenditure is required to prepare abutting edges in such a way that the welded joint may be of the flush-butt type and easily X-rayed. Moreover, it is difficult to apply automatic butt-welding techniques to such a construction.

It is an object of the present invention to avoid these difficulties and to provide a duct having a corner bend of such a shape as to permit joints which are subject to pressure to be easily flush-butt welded and to allow the necessary weld preparations to be carried out by turning or boring circular sections.

According to the invention, a duct for conveying fluid gases or liquids under pressure or vacuum has a corner bend surrounded by a shell of substantially spherical shape which forms a pressure-resisting wall.

The cascade bend itself, which still forms the fluid-deflecting means, may be made of light-gauge material since it is not now required to withstand pressure and is subject only to relatively low aerodynamic forces. The intersections of the spherical shell with the cylindrical ducts may have the form of plain circles so that the necessary compensating rings can be prepared by circular generation. Thus, flush-butt weld conditions are easily produced. The cascade bend can be joined to the shell by bolting or welding, and suitable expansion equalisation holes or slots may be provided.

In order that the invention may be thoroughly understood, two embodiments thereof will now be described with reference to the accompanying drawings, in which.

Figure 1:
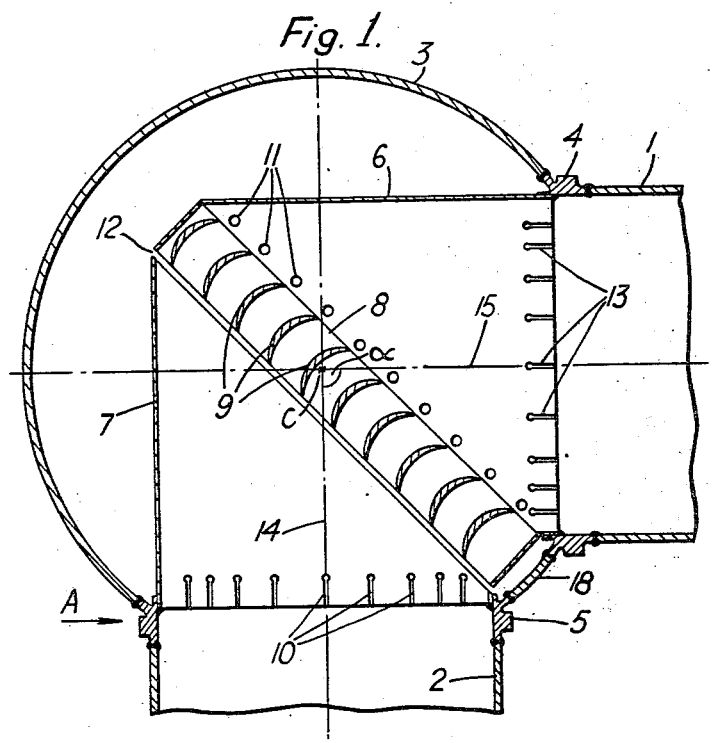
FIGURE 1 is a cross-sectional view of a corner bend housed in a substantially spherical casing, the ends of the two perpendicularly-arranged ducts being joined to the casing by means of two compensating rings the meridian planes of which intersect at right angles.

Referring to FIGURE 1, two ducts 1 and 2 of circular cross-section are joined to circular apertures in a shell 3 of substantially spherical shape, compensating or reinforcing rings 4 and 5 respectively being provided at each of the joints. Machined weld surfaces are produced by means of turning and, as illustrated in more detail in FIGURE 2, the welded joints are of the flush-butt type and can be X-rayed. An internal light-gauge construction extends the aerodynamic shapes of the ducts into the shell 3 and consists of tubular inserts 6 and 7 and an elliptical cascade belt 8 having a number of vanes 9. Slots 10 in the insert 7, holes 11 in the insert 6, a gap 12 between the belt 8 and the insert 7, and slots 13 in the insert 6 provide communication between the flow through tubular inserts 6 and 7 and the space defined by the inner surface of the shell 3 and the outer surfaces of inserts 6 and 7 to bring about pressure equalization on the surfaces of the inserts 6 and 7 and the belt 8. It is the gap 12 which provides the main pressure balancing flow passage for pressure equalization. In addition, the gap 12 between the belt 8 and the insert 7 provides for linear expansion of the tubular inserts 6 and 7 which may occur under high temperature conditions. Internal joints in the embodiment illustrated are shown as produced by welding, but other methods of joining, for example, by means of nuts and bolts, may be used. Since all joints inside the shell are not subject to pressure loading, their soundness is not of major importance and a process of fillet welding may be applied.

The radius of the shell 3 is determined by the major axis of the belt 8. The length of the latter and the diameter of the duct apertures in the shell are controlled by the diameter of the ducts 1 and 2 which, in turn, is determined by the rate of flow of the fluid to be conveyed and by its temperature and pressure under normal operating conditions.

As shown in FIGURE 1, the longitudinal axes 14 and 15 of the ducts 1 and 2 intersect at the centre C of the spherical shell 3. Where these longitudinal axes intersect at an included angle α greater than 90°, the duct apertures in the shell 3 and the respective compensating rings 4 and 5 will generally be spaced at such a distance that the arc or surface 18 of the shell left between the rings 4 and 5 meets accepted design and/or welding standards, for example, the standards set forth in British Standard 1500/58, class I, "Fusion-Welded Pressure Vessels Unfired," or in the American Society of Mechanical Engineers "Boilers and Pressure Vessel Code," section VIII. This may not be the case, however, if the axes are required to intersect at an included angle of 90°, or even less than 90°. The simplest way of overcoming the difficulty arising in this instance would be to increase the diameter of the casing. However, conditions may arise which render the accommodation of a larger casing impossible. Thus, it is advantageous if the diameter of the casing determined by the factors previously referred to can be reduced—or the predetermined diameter maintained while the duct diameter is increased—without, of course, interfering with its proper function.

Figure 3:
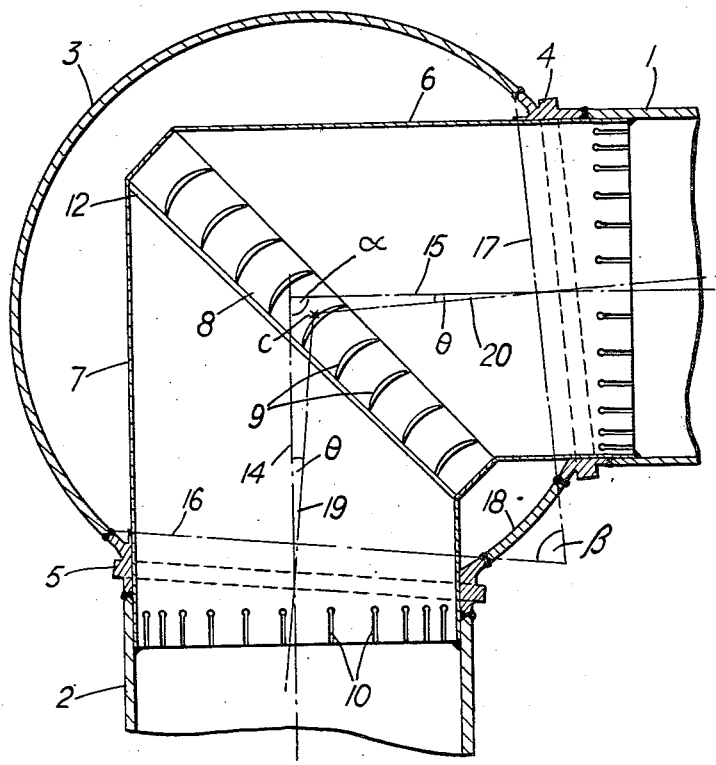
FIGURE 3 is a cross-sectional view of a spherical corner bend casing similar to the one illustrated in FIGURE 1 but in which the meridian planes of the two compensating rings intersect at an included angle of less than 90°.

A construction which allows these aims to be achieved is illustrated in FIGURE 3. In order to provide between the two compensating rings 4 and 5 a shell arc 18 in accordance with the standards referred to above, the compensating rings are joined to the casing in such a fashion that their meridian planes 16 and 17 intersect at a predetermined angle $\beta$ of less than 90°. This would normally increase the size of the included angle $\alpha$ between the two duct axes 14 and 15 by an amount equal to the difference between 90° and the angle $\beta$. Since, however, the duct axes 14 and 15 are still required to intersect at right angles, the reduction of the angle $\beta$ between the meridian planes 16 and 17 is compensated by machining the bore of each compensating ring 4 and 5 about an axis 14 or 15 which makes with the axis 19 or 20 lying at right angles to its meridian plane 16 or 17 an angle $\theta$ equal to one half the difference between 90° and the angle $\beta$.

Figure 2:
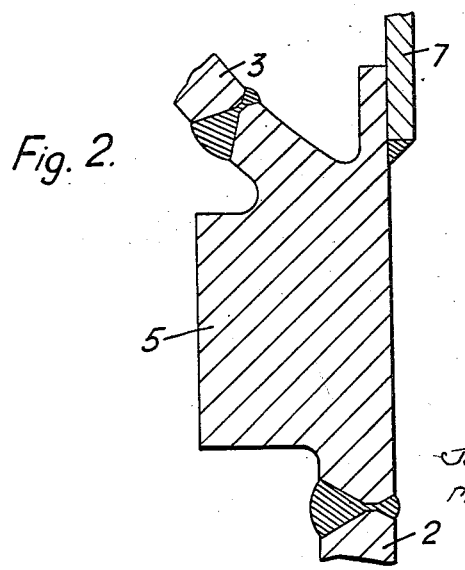
FIGURE 2 is a cross-sectional view on an enlarged scale of the joint indicated by the arrow A in FIGURE 1.

As an indication of the saving in metal which is made possible by the invention, specific details of typical corner bends constructed as shown in FIGURES 1 and 2 or FIGURE 3 are given below by way of example.

| | |
|---|---|
| Pressure of gas | 264 p.s.i.g. |
| Temperature of gas | 400° C. |
| Internal diameter of the ducts 1 and 2 | 5 ft. 6 inches. |
| Wall thickness of the ducts 1 and 2 | 1 inch. |
| Internal diameter of the shell 3 | 8 ft. 6 inches. |
| Wall thickness of the shell 3 | ¾ inch. |
| Wall thickness of the tubular inserts 6 and 7 | ¼ inch. |

The slots 13 and the holes 11 may be omitted in either of the embodiments illustrated. Further, the width of the cascade belt, instead of being uniform as illustrated in FIGURE 1, may vary as illustrated in FIGURE 3.

The longitudinal axes of the ducts 1 and 2 and of the tubular inserts 6 and 7 in the embodiments illustrated are shown as being contained in one and the same plane. It is possible however for the axes of the elements 1 and 6 and 2 and 7 respectively to be contained in different planes.

We claim:

1. A duct for conveying gases or liquids under pressure or vacuum, said duct having a corner bend split radially into two unjoined duct portions, the confronting edges of the unjoined duct portions being spaced from one another to form a pressure balancing flow passage, fluid deflecting means positioned at the corner bend, said fluid deflecting means being affixed to one of the split duct portions and spaced from the other, a fluid tight pressure resisting shell of substantially spherical shape having a pair of apertures therein, said shell surrounding the corner bend so that the split duct portions are in fluid tight engagement with the shell apertures whereby fluid within the duct will pass through the pressure balancing flow passage and produce a balancing pressure in the space between the outer surface of the unjoined duct portions and the inner surface of the shell to eliminate stresses on the duct portions within said shell.

2. The invention as described in claim 1 and wherein additional pressure balancing flow passages are formed in the split duct portions.

References Cited in the file of this patent

UNITED STATES PATENTS

| | | |
|---|---|---|
| Re. 25,153 | Speiser | Apr. 3, 1962 |
| 411,864 | Leaycraft | Oct. 1, 1889 |
| 783,586 | Luff | Feb. 28, 1905 |
| 1,118,955 | Sharp et al. | Dec. 1, 1914 |
| 1,996,596 | Smith | Apr. 2, 1935 |
| 2,183,174 | Smith | Dec. 12, 1939 |
| 2,297,979 | Peck | Oct. 6, 1942 |
| 2,662,553 | Dimmock | Dec. 15, 1953 |
| 2,837,810 | Ekholm | June 10, 1958 |
| 2,884,956 | Perlin | May 5, 1959 |

FOREIGN PATENTS

| | | |
|---|---|---|
| 631,762 | Germany | June 26, 1936 |